Patented Apr. 17, 1934

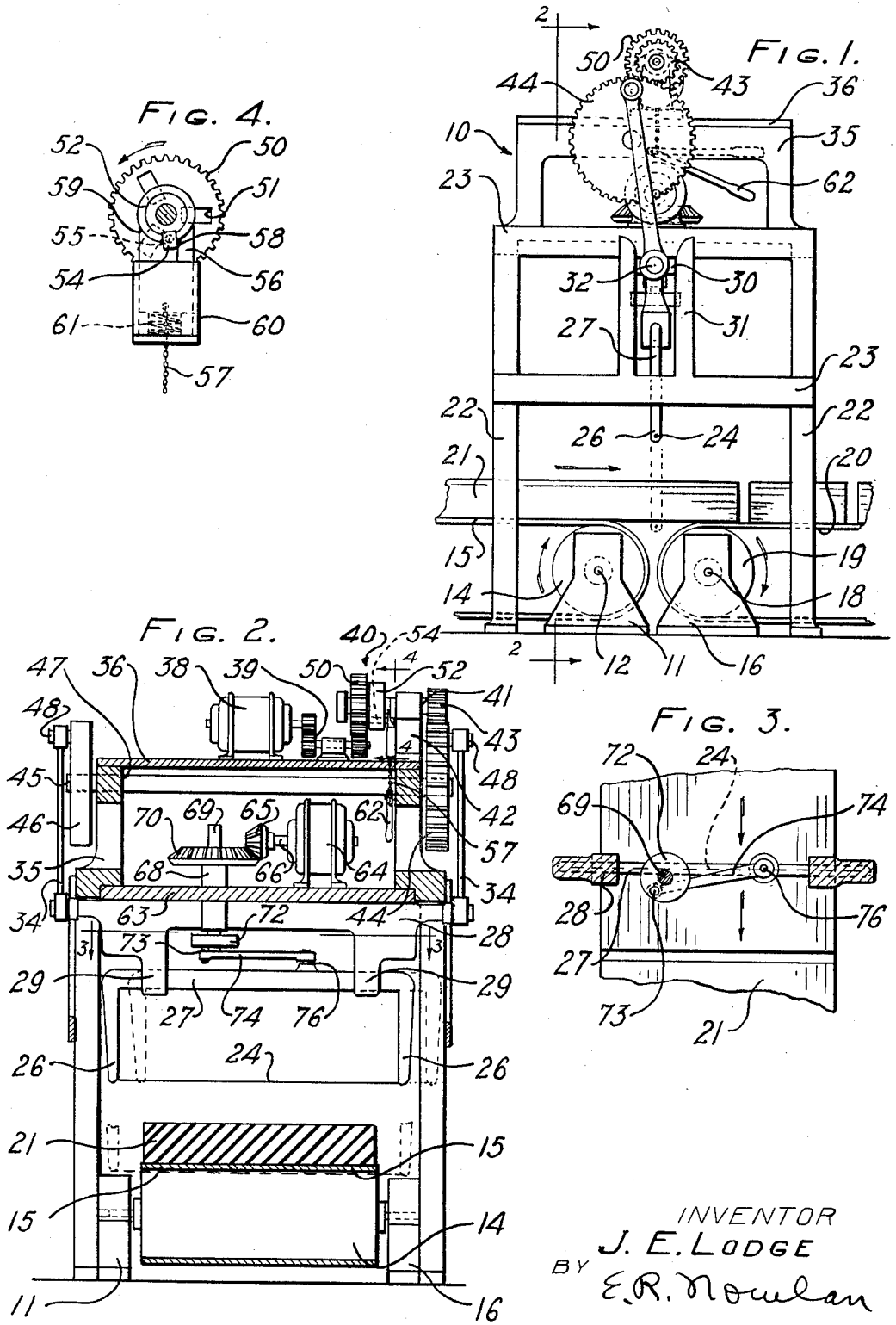

1,955,004

UNITED STATES PATENT OFFICE 1,955,004

SEVERING APPARATUS

Joseph E. Lodge, Baltimore, Md., assignor to Western Electric Company, Incorporated, New York, N. Y., a corporation of New York Application August 9, 1930, Serial No. 474,278

6 Claims. (Cl. 164—53)

This invention relates to severing apparatus and more particularly to an apparatus for severing masses of plastic material.

An object of the invention is to provide an apparatus for severing material which will be compact and sturdy in construction, and rapid and efficient in operation.

One embodiment of the invention contemplates the provision, in an apparatus for severing a moving mass of soft rubber compound into portions of substantially identical size, of a pair of endless conveyors for carrying the mass, one of the conveyors traveling horizontally from an extruding apparatus, and the other for receiving severed blocks of the material and advancing them in the same direction at an increased speed. A U-shaped member having a wire stretched tautly between its upright portions is reciprocated vertically through the material between the conveyors and at regular intervals, and is simultaneously reciprocated horizontally across the material to promote the severing. The crosswise oscillation of the U-shaped member is secured by a suitable motor, gears, and a crank wheel, the assembly being oscillated in the vertical direction by a stationary motor, suitable gearing and a one revolution stop clutch.

The invention will be more fully understood by reference to the following detailed description, read in connection with the accompanying drawing forming a part thereof, in which Fig. 1 is a fragmentary side elevational view of an apparatus embodying the invention;

Fig. 2 is a section taken on the line 2—2 of Fig. 1;

Fig. 3 is a fragmentary section taken on the line 3—3 of Fig. 2 and

Fig. 4 is a fragmentary section taken on the line 4—4 of Fig. 2.

Referring to the drawing, wherein similar parts are indicated by identical reference numerals, an apparatus for severing plastic material, generally denoted by the numeral 10 is provided in the lower portion thereof with a pair of supports 11—11 in which is rotatably mounted a shaft 12 extending transversely of the apparatus. An idler roller 14 is secured to the shaft for carrying, at any desired speed, a belt or other suitable endless conveying means which is moved in the direction indicated by the arrow (Fig. 1) by any suitable driving means (not shown). A second pair of roller supports 16—16 are provided to receive a shaft 18, parallel with the shaft 12, and extending transversely of the machine, upon which shaft is secured an idler roller 19. The roller 19 carries a suitable belt or endless conveyor 20 which is rotated in the direction indicated by the arrow (Fig. 1) by any suitable driving means (not shown) and at a rate somewhat faster than the rate at which the conveyor 15 is driven. It will be understood that the apparatus described may be placed immediately adjacent to the outlet of an extruding head of any suitable type of plastic compound mixing machine (not shown) in such manner that extruded material will be immediately deposited upon the conveyor 15 and carried thereby away from the extruding head. When the apparatus is so located, the material, as it is placed upon the conveyor 15, is quite warm, and comprises a viscous and sticky group of strings of rubber compound which, due to their temperature, usually soon run together to form a substantially integral mass 21, as shown in Fig. 1.

Spaced at either side of the belts and adjacent the rollers 14 and 19 are two pairs of uprights 22—22, the uprights on either side of the conveyor being connected by suitable bracers 23—23 to form a rigid supporting scaffolding. A severing tool or cutting element 24, which may be composed of any suitable strand material but preferably of strong wire, is stretched taut and mounted at either end in end projections 26—26 of a U-shaped supporting frame 27. A horizontal beam 28 (Fig. 2), having downwardly projecting ears 29 in which is slidably keyed the U-shaped frame 27, extends across the apparatus and is provided adjacent each end with a guide block 30 (Fig. 1) which is adapted to ride in suitable guides 31—31 mounted upon the bracers 23—23 on each side of the apparatus. Round projections 32—32 extend from either end of the beam 28 beyond the blocks 30 and have pivotally secured thereto elongated arms 34—34. At the top thereof the uprights 22—22 are surmounted on each side of the machine with a pedestal 35 upon which is secured a horizontal transverse shelf 36. A motor 38 is positioned upon the shelf 36 and is connected by suitable gearing 39 to a conventional one revolution stop clutch, generally designated by the numeral 40, to drive a shaft 41. A bearing support 42, securely mounted upon the shelf 36 at the end thereof, is provided to accommodate the shaft 41. A gear 43 suitably secured to the shaft 41 meshes with an externally toothed crank wheel 44. The crank wheel 44 is keyed upon a shaft 45 which extends transversely across the apparatus, at the opposite end carrying a corresponding crank wheel 46 which is secured thereto and rotatable in accordance with the crank wheel 44. The shaft 45 is freely rotatably journalled in apertures 46—46 formed in the pedestals 35 in order that the crank wheels 44 and 46 may be driven in unison from the gear 43. The crank wheels 44 and 46 are provided with stationary pins 48—48 positioned peripherally on the crank wheels and, as will be observed in Figs. 1 and 2, are adapted to constitute a pivotal mounting for the arms 34—34.

Although the clutch 40 may be of any conventional type capable of giving a one revolution and stop action, it may be specifically pointed out that the present type consists of a gear wheel 50 (Fig. 4) having spaced side apertures 51 of any suitable number. The gear 50 is freely rotatable upon the shaft 41 in such manner that it may be continually rotated by the gearing 39 without causing rotation of the shaft 41. A collar 52 formed adjacent the gearing 50 and rotatable with the shaft 41 is provided with a notched pin 54 which is normally pressed by means of a spring 55 acting against a portion of the collar in a direction to cause it to move into one of the apertures 51 of the gear 50. This tendency, however, is controlled by means of a wedge 56 having a depending chain 57, an enlarged shoulder 58 and a feather edge 59. The wedge is slidably mounted in a guide 60 secured to the bearing support 42 and is urged upwardly by a spring 61 compressed in the guide. A lever 62 pivotally mounted in the pedestal 35 beneath the clutch is connected at one end to the chain 57 in such manner that when the opposite end of the lever is elevated, the wedge is drawn out of engagement with the projection of the pin 54, thus permitting the spring 55 to thrust the pin across the wedge and into one of the apertures 51 of the clutch gear. This causes the collar 52 to be rotated with the motor driven gear 50 through one complete revolution shortly before the termination of which the projection of the pin engages upon the feather edge 59 of the wedge and as the pin is rotated beyond the feather edge the increasing thickness of the wedge causes the pin to be withdrawn from the aperture 51, the pin coming to rest upon the shoulder 58 of the wedge, thus stopping the rotation of the collar 54.

A shelf 63 is secured on top of the beam 28 and supports a motor 64 for driving a bevel gear 65 keyed to the end of a drive shaft 66 of the motor. Secured in the shelf 63 is a vertically extending collar 68 in which is rotatably journalled a shaft 69 to the upper end of which is secured a larger bevel gear 70 which meshes with the bevel gear 65 to rotate the shaft 69. Upon the lower end of the shaft 69 a crank wheel 72 is secured, the crank wheel being formed with a peripheral pin 73 upon which is pivotally mounted an arm 74. A pin 76 is secured to the upper surface of the supporting frame 27 and connected to the pin 73 by means of the arm 74, which arm is pivotally mounted upon both pins 73 and 76.

In operating the described apparatus, the mass of material is carried by the conveyor 15 in the direction indicated in Fig. 1 until it passes beyond the roller 14 and is taken up and advanced in the same direction beyond the roller 19 by the conveyor 20. It will be noted that in passing between the rollers 14 and 19 a portion of the mass is not immediately in contact with any supporting means, and that it is practicable at this point to pass a severing tool entirely through the mass of the material without interfering with either of the conveyors. In order to accomplish this, the severing tool is located, as shown in Fig. 1, above and between the rollers. The rotation of the crank wheels 44 and 46 by the described clutch 40 rotates the arms 34 to move the beam 28 and the depending U-shaped support 27 along the guides 31 in a vertical direction, and perpendicularly to the horizontally moving mass of material. When a sufficient quantity of material has passed from the conveyor 15 unto the conveyor 20, the lever 62 is lifted to lower the chain 57 and wedge 56, withdrawing the latter from engagement with the notched pin 54, thus permitting the pin to engage with one of the apertures 51 of the motor driven clutch gear. The lever 62 is instantly released and the wedge pressed upwardly again by the spring 61 into position to engage the pin and withdraw it from the aperture, thus disconnecting the collar 52 from the rotating clutch gear 50 upon completion of one rotation of said collar. The ratios of the described gears and the crank wheel 44 are such that the latter is rotated by this operation through approximately 180°, bringing the severing wire 24 downwardly through the material and causing it to assume the position indicated by dotted lines in Figs. 1 and 2.

The crank wheel 72 is continually rotated from the motor 64 to cause the U-shaped supporting member 27 to be rapidly oscillated from side to side in the ears 29 of the beam, and this movement causes the wire 24 to be moved across the mass of material from side to side thereof in a horizontal direction as the wire is being carried downwardly through the mass by the arms 34. The wire 24 is permitted to remain below the path of the material until a sufficient quantity to constitute a slab thereof of the desired size has passed from the conveyor 15, whereupon the lever 62 is again momentarily lifted, thus reconnecting the collar with the clutch gear and causing the crank wheels 44 to be again rotated through an angle of 180° to bring the cutting wire 24 upwardly through the material. It should be borne in mind that during this movement also the wire is continuously oscillated from side to side and across the path of the material and perpendicularly thereto. The described operations may be repeated until the charge of the extruding head or compound preparing machine is exhausted, the vertical oscillation of the beam 28 being controlled by the operator to insure that the mass of material is divided into portions or slabs of any desired size.

From the foregoing it will be observed that the combined horizontal and vertical oscillations of the wire cause the viscous mass to be rapidly and effectually divided. The severed portions of the material are prevented from merging because as each portion is severed it is moved forwardly at an increased rate of speed on the conveyor 20, thus placing the successive blocks a substantial distance apart. The operation of separating the severed portions is facilitated by reason of the fact that the wire, having passed entirely across the path of travel of the material, the portions are entirely severed, with no connecting shreds or strands remaining to bind the portions together.

What is claimed is:

1. In an apparatus for severing material, a vertically reciprocable supporting member, a horizontally reciprocating severing means carried by said supporting member, and a power means carried by said supporting member for continuously reciprocating said severing means.

2. In an apparatus for severing material, a vertically reciprocable supporting member, a horizontally reciprocating severing wire carried by said supporting member, a power means for reciprocating said supporting member, a motor carried by said supporting member, and a crank connection between said motor and said severing wire for continuously reciprocating said severing wire horizontally.

3. In an apparatus for severing material, means for carrying the material to be severed along a predetermined path, a vertically reciprocable supporting member, a stop action clutch mechanism for reciprocating said supporting member, a horizontally reciprocating severing member slidably mounted in said supporting member, and a power operated means carried by said supporting means for continuously reciprocating said severing member horizontally across said predetermined path to sever the material.

4. In an apparatus for severing material, a vertically reciprocable supporting member, means for periodically reciprocating said supporting member, a horizontally reciprocating severing member carried by said supporting member, and a power means carried by said supporting member for continuously reciprocating said severing member.

5. In an apparatus for severing material, a vertically reciprocable supporting member, means for reciprocating said supporting member, means for automatically stopping the reciprocation of said supporting member after completion of a single reciprocation, a horizontally reciprocating severing member carried by said supporting member, and means carried by said supporting member for reciprocating said severing member.

6. In an apparatus for severing material, means for moving the material to be severed along a predetermined path at a predetermined rate, a vertically reciprocating supporting means, a severer mounted in the supporting means, means for moving the severed portions of the material along a path at a greater rate of speed than the material to be severed, means for moving said reciprocating supporting means upward to bring the severer in contact with the material when the portions to be severed are in contact with the means for moving the severed portions, and means carried by the vertically reciprocating supporting means for continually oscillating the severer horizontally to sever the material.

JOSEPH E. LODGE.